July 31, 1956

C. C. HERITAGE 2,757,150

PREPARING HOT-MOLDABLE THERMOSETTING
RESIN AND CELLULOSE FIBER MIXTURES

Filed Jan. 30, 1953

Inventor
Clark C. Heritage
by W. Bartlett Jones,
Attorney

July 31, 1956

C. C. HERITAGE 2,757,150

PREPARING HOT-MOLDABLE THERMOSETTING
RESIN AND CELLULOSE FIBER MIXTURES

Filed Jan. 30, 1953

Inventor
Clark C. Heritage
by W. Bartlett Jones,
Attorney

Inventor
Clark C. Heritage
by W. Bartlett Jones,
Attorney

United States Patent Office 2,757,150
Patented July 31, 1956

2,757,150

PREPARING HOT-MOLDABLE THERMOSETTING RESIN AND CELLULOSE FIBER MIXTURES

Clark C. Heritage, Tacoma, Wash., assignor, by direct and mesne assignments, of one-half to Weyerhaeuser Timber Company, Tacoma, Wash., a corporation of Washington, and one-half to Wood Conversion Company, St. Paul, Minn., a corporation of Delaware Application January 30, 1953, Serial No. 334,164

13 Claims. (Cl. 260—17.2)

The present invention relates generally to the manufacture of hot-pressed fiberboard and prepared wood material useful therefor and otherwise, and more particularly to a continuous process for converting wood quickly to a finished whole wood fiberboard without any substantial loss of wood substance or marked change in initial wood composition.

The manufacture of such fiberboards has long been carried out by preparation of a feltable fiber, commonly from wood, followed by felting the fiber. Water suspensions have been commonly employed, either in preparing the fiber, or in felting it, or both. The conditions obtaining during water suspension are such that a substantial fraction of the original wood substance is lost by dissolution in the water. This dissolved material comprises substances derived from the original wood, such as various forms of lignin, polysaccharides and other organic material. The material so removed has fiber-bonding properties. Its loss from the fiber in the felt increases the need for added bonding material to secure an adequate bond. Usually, this added bonding material is a synthetic resinous material, far more costly than wood. The cost of operating a hardboard process is a matter of such great magnitude that process changes which lower the cost, improve the product, minimize waste of raw material, or expedite the process, are current universal objectives in the industry. Such an economical process change would be to convert wood to fiber and to felt it, without water suspension at any point in the process. However, difficulties are involved. It is difficult to secure uniform distribution of low usage of binder. Mechanical difficulties are encountered in dry felting to secure uniform density, thickness and appearance of mats and resulting boards. These and numerous other difficulties are well known to those working in the field.

It is the general object of the present invention quickly and directly to convert wood to a homogeneous fiberboard without any appreciable loss or change of the natural wood substance.

It is another object of the invention to utilize original material of the wood as part of the fiber-bonding substance, and thereby to lessen the amount of added bonding material.

It is also a general object of the invention to provide a substantially dry process which in continuous operation may convert original wood quickly to fiberboard without need for any prolonged operation or process period.

It is also an object of the invention to form and utilize intermediate products of the complete process as valuable preform material for fiberboard or other end products.

It is an object of the invention to employ as binder a solution of resin-forming solids, and efficiently to distribute the resinous content as solids over the fibers which are to be bonded thereby.

It is a particular object to employ a fiber form of whole wood substance which has been suitably treated by steam to add to the capacity of the fibers to effect precipitation on the fibers of thermosetting resin solids from films of applied resin solution; and thereafter quickly to reduce the water content under conditions to preserve thermosetting properties in said resin, and to provide resin-coated moist fibers for dry felting.

Various other and ancillary objects and advantages of the invention will become apparent from the following description and explanation of the invention, given in connection with the accompanying drawings in which.

Figure 1:
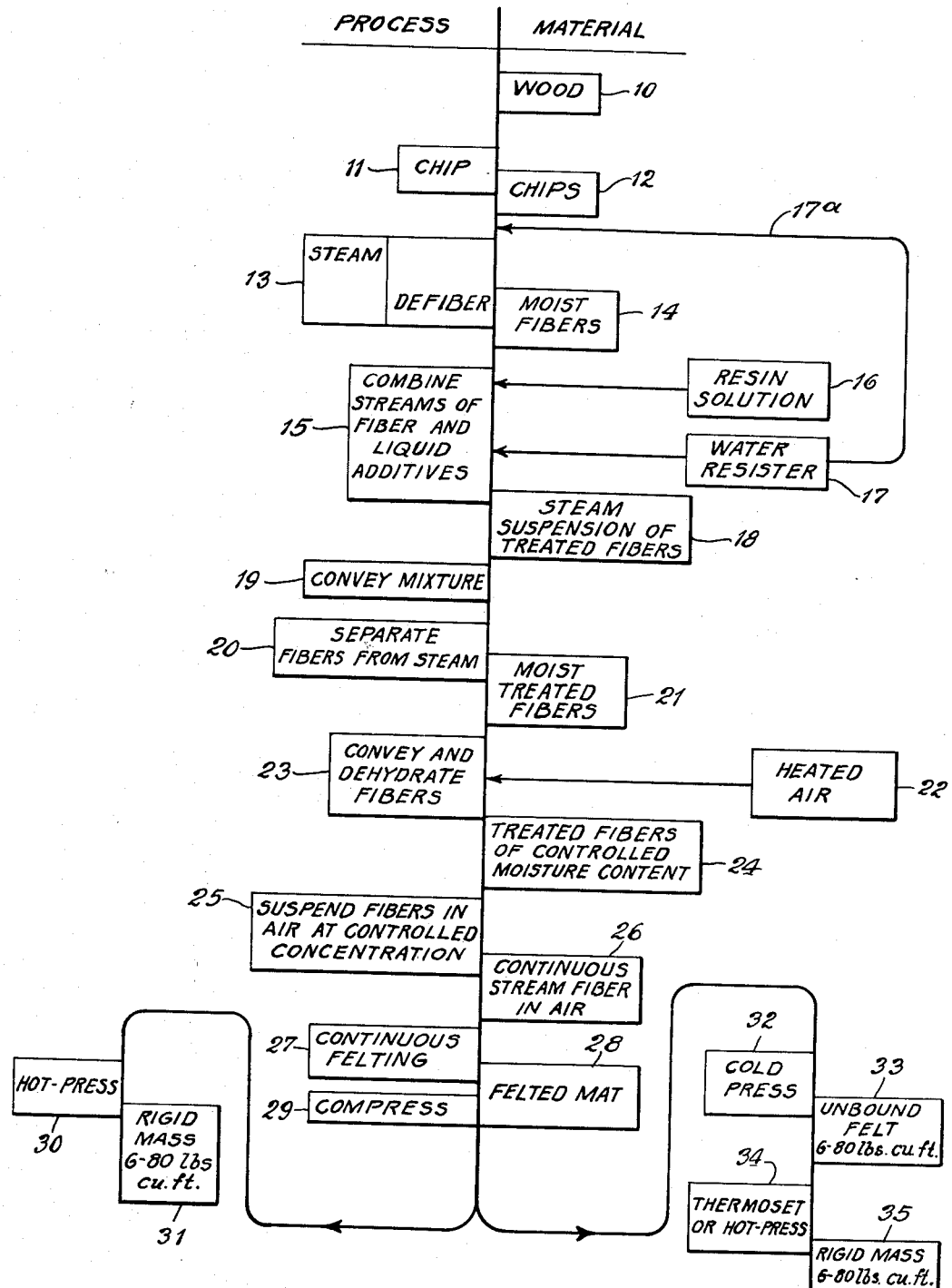
Fig. 1 is a flow sheet involving steps and materials in the processing.

Ultimately, the present invention aims to convert wood as ultimate fibers to a felt containing also a thermosetting resin for bond for hot-pressing to a hard fiberboard. It involves early association of the resin with the ultimate fibers prior to felting, so that the fibers which are subjected to felting are thermosetting fibers, and their felts are thermosetting felts. Consequently, the fibers and felts carrying the resin are useful as molding fibers and felts for numerous purposes by numerous operations.

In the practice of the process from wood to hard fiberboard, the steps are such per se that they may be and are preferably so combined as to effect a rapid conversion of wood to hard fiberboard. To a major extent the wood substance is in continuous motion as streams of different characters, so that it is one characteristic of the invention that the resin as a stream is introduced to the fiber as a stream, as will appear below.

The invention is hereinafter explained by reference to the presently preferred species wherein the defibering process and effects therefrom facilitate the application of the resin to the fiber.

In the process and apparatus of the U. S. Asplund patents, respectively No. 2,008,892 and No. 2,145,851, wood chips are introduced into a high-pressure so-called inert gaseous environment, providing a temperature above 212° F. at which lignin content of the particular wood is softened to permit ready defibration by mechanical means. The chips quickly soften and are fed directly to a rotary defibering disk mechanism housed in said environment, which mechanically rubs the softened chips to ultimate fibers, or a predominance of such fibers, according to the disk adjustment. Then the resulting defibered wood is discharged to the atmosphere. All this may take place in from 0.5 to 6 minutes. The said patents refer to steam as a preferred and inert environment. According to Asplund U. S. No. 2,047,170, treating agents, such as wax or rosin may be added with the chips or otherwise be present at the time of defibering for distributing the same uniformly onto the fibers.

Subsequent studies of the process have disclosed that a steam environment so functioning in the Asplund machine is not absolutely inert and that it effects changes in the composition of the wood. These changes are indicated by an increased content of water-soluble material in the fiber, over that in the original wood. In a time from 30 to 60 seconds, the water-soluble content of various woods is given in the following Table I.

TABLE I

| Wood | Steam Gauge Pressure, lbs. per sq. in. | Percent Water-Soluble Material in Dry Fiber |
| --- | --- | --- |
| Peeled Aspen [1] | 128 | 9.9 |
| Peeled Spruce | 150 | 8.6 |
| Peeled Maple | 150 | 9.2 |
| Peeled Jack Pine | 150 | 10.7 |
| Peeled Douglas Fir | 150 | 12.8 |

[1] Unprocessed raw chips have 5.1% water-soluble content.

The foregoing table shows only comparative values. The figures given vary not only with the processing, but with the season when the wood is cut. The amount of water present in the wood substance, for example, the amount added with the chips in introducing them into the Asplund machine, also effect variations in the results.

The newly created water-soluble material is organic, including polysaccharides and active organic acids. It contains a minor content of soluble lignin material. These materials substantially all dry to thermoplastic or thermosetting bonding material, and it is desirable to retain them with the fiber for such function.

It is known that natural wood substance is chemically altered when maintained in an environment of steam over a period of time ranging from a matter of a few seconds such as 30 seconds to longer times, and at steam pressures and temperatures ranging from atmospheric pressure upwardly to such pressures that certain undesirable temperatures and reactions are encountered. There are critical steaming conditions at which there is gasification of the wood substance including the generation of furfural from pentose sugars, evidenced later in the product by the severe darkening which accompanies furfural. Time and temperature of steaming are involved. For example, in two comparative cases, there is appreciable gasification and darkening after 2 minutes at 200 p. s. i. g. (388° F.), and after 4 minutes at 175 p. s. i. g. (377° F.). Where the term "non-gasifying conditions" is herein employed it signifies a time and temperature below that critical combination where furfural is formed and the wood appreciably darkened. The term "critical steaming conditions for gasification" refers to that combination of time and temperature beyond and above which furfural forms in amounts appreciably to darken the wood substance.

The action of the steam and the mechanical defibering may be independent. The wood may be steamed, then defibered, or defibered and then steamed, or otherwise these two operations may be mixed. The Asplund machine offers the advantage that less power is involved to defiber and less damage to ultimate fibers occurs, by mechanically rubbing the wood substance to fibers while it is in a softened condition as a result of the heating by steam. Accordingly, the sequence and conditions of steaming and defibering which are inherent in use of the Asplund machine are not essential limitations of the processing for the present invention.

At a given temperature the shorter the time the natural wood is in the steam environment the lighter is the color of the fiber. For 30 to 60 seconds treatment at 150 lbs. p. s. i. g. the color is comparable to that of raw fibers produced without any steam action. Such light-colored fibers are necessary for the production of light-colored board. Therefore, the normal, efficient operation of an Asplund machine, as used today in commerce, sufficient to defiber economically, produces a light-colored fiber containing a rather constant quantity of extractable water-soluble material including free acid.

The fiber so produced may be hot-pressed to yield an integrated bonded board. However, the board so constituted is not water-resistant. Stringent commercial requirements call for a highly water-resistant board. Therefore, a water-resistant bonding agent and also an agent to render the fibrous material itself resistant to water are added.

A thermosetting resin, such as a condensation product of phenol and formaldehyde, is used as the added bonding agent. After thermosetting the resin forms a bond which is not significantly weakened by water. Because of the retention of natural bonding material described above, an unexpectedly small amount of resin is highly efficient in imparting dry strength to the board when efficiently distributed as herein described. To the degree that a water-resister for the fiber is employed, this dry strength is retained when the board is wet.

It is difficult to mix uniformly small amounts of fluid additives with bulk fiber. In the present invention such mixing is achieved by merging continuous streams of the additives and fiber, the fiber stream being a suspension of the fiber in a gas. This mixing is most readily accomplished in a region of high velocity for the fiber stream. Near the point where a continuous stream of the fiber passes through an orifice from the high-pressure environment of defibering to a lower pressure, one or more streams of fluid additives are combined with it.

In the case of an agent to render the fibers water-resistant, it is desired that a material such as rosin, wax, hydrocarbon, or mixture, penetrate the fibers. The heated condition of the fibers at the defibrator discharge orifice assures this penetration. However, where a bonding agent is added, it is desired that the bonding agent not penetrate the fibers, but rather that it reside on the surface of the fibers. The present invention permits simultaneous penetration and coating by these two types of additives.

Deposition of added binder on the surfaces of the fibers is readily effected by using an alkali—stabilized solution of the bonding material which solution precipitates the binder when its alkaline stabilizing content is neutralized to a suitable extent. Because the fibers used contain acid, the application of such an alkaline solution to the fibers effects a degree of neutralization that deposits binder on the surface of the fibers. A small amount of volatile acid is present in the steam vehicle carrying the fibers. Wetting the fibers with an alkaline solution neutralizes this acid as exposure continues.

Since the initial meeting of the streams is inadequate for instantaneous neutralization reactions and homogeneous distribution of the added material, the fiber and the additives are conveyed over a suitably long distance in a gaseous vehicle for continued intermixing and to utilize any vaporized acid in the steam atmosphere. This leads to more uniform distribution of additives, especially of precipitated binder, on the surfaces of the fibers. By connecting a conduit directly to the discharge orifice or other outlet of the Asplund defibrator, the steam discharged with the fibers serves as a carrying vehicle for the material along the conduit. Thermal radiation and pressure lowering result in a temperature decrease and the resulting condensate is taken up by the fibers. At a convenient point in the apparatus the moisture-laden fibers are separated from the residual steam vehicle, for example, in a separating cyclone. The separated fibers are then picked up by a carrying vehicle of dehydrating hot air and again conveyed while being dehydrated to any desired degree of moisture content.

Because water-wet fibers cohere without hot compression, whereas dry fibers interfelt without like cohesion, a proper content of moisture for the general purpose of the present invention is one such that the fibers with permissive moisture content are non-coherent in mass form except for interfelting. For the purpose of readily conveying such fibers a moisture content of 60% by weight is a practical maximum. However, where the fibers are felted from such conveyance without further drying, the moisture content requirements of the felting operation predetermine the extent to which the fibers are dried in the pneumatic conveying and drying operation. For the operation herein referred to as "dry felting" precautions for safety dictate a minimum content of 10% moisture. However, for the successful operation of the dry felting, that is, to secure continued uniformities in numerous respects, an upper limit within the range from 25% to 35% moisture content is observed. Mats are thus formed of fibers which have not more than 35% moisture content. Where more moisture is desired for hot-pressing operations, the mat may be conditioned, for example, by spraying additional water on one or both surfaces just before pressing. For example, water content of the pressable mat may thus be raised to 40%, equally distributed over the surface areas, but not necessarily equally distributed throughout.

The fibers while in transit during such dehydration may be treated to alter the coarseness modulus of a mass thereof. For example, the coarser fraction may be continuously separated from the finer fraction, and be either removed or by-passed to a continuously operating size-reducer, such as defibering discs, continuously discharging its reduced material back into the stream of the said finer fraction. The fiber mass so dehydrated, with or without adjustment of its coarseness modulus is a feltable hot-moldable whole-wood fiber.

The said alteration in coarseness modulus does not interfere with the provision of a continuous stream of treated whole-wood fiber ready for felting. Hence, such stream is led to a continuous felter, such as one in which the fiber in air suspension is felted by suction filtering action to form a continuous low-density mat. Such a mat as formed, or as formed and compressed, is a useful hot-moldable felt or preform for a pressing or molding operation. The mat may be hot-pressed to board of any density up to approximately 90 pounds per cu. ft. For uniformly dense board, it is most important that the said felted mat be uniform in all of its characteristics. Inequalities in density or thickness of the mat, unless one offsets the other, are manifest in a pressed board to an increasing degree as the board density increases.

The desired dehydration of treated fibers by conveyance in a stream of hot air may involve changing the vehicle. For example, after travel in heated dehydrating air, the latter takes up moisture and cools, thus losing dehydrating capacity. The resulting fiber-in-air suspension may be separated in whole or in part by introducing it into a cyclone which discharges either the fiber itself, or an air stream more concentrated in fiber, into a new supply of dehydrating air.

One purpose of so reducing the moisture content of the fiber is to perform the act quickly and thus avoid loss of an effective thermosetting quality in the resin coated on the fiber. By exposure of individualized suspended resin-bearing fibers in the dehydrating air, the dehydrating process is expedited. The more moisture retained in the fiber at the end of the dehydration, the quicker the dehydration step may be practiced other factors remaining constant. The temperature of the conveying air for the dehydrating step must be adjusted with respect to the time involved and the resin, to minimize advancement of the thermosetting resin. The critical temperature varies with the resin and with the time. In general for the phenol-formaldehyde resin A hereinafter described, a temperature over 250° F. is avoided in a dehydrating time of 15 seconds.

A continuous felting station is provided at which there is a transfer of fiber from the air-vehicle bringing it from the dehydration step, to a new vehicle of air where such is used in a felting machine. Such a new air vehicle is regulated with respect to the content of fiber carried by it, and with respect to certain characteristics of the felting process. Such a felting process therefore calls for a temporary store of bulk fiber, constantly drawn upon in felting, and substantially continuously fed to maintain the store.

The dehydration step is preferably carried out so that the fiber feeds into a cyclone from which it is discharged to a storage hopper associated with the felter. The hopper may discharge to a volumetric feeder in which fibers fluffed to substantially uniform density are deposited and carried on a belt at substantially uniform volume per unit area, and hence uniform weight of moist fiber per unit area. When the moisture content is uniformly controlled, the oven dry weight of fiber per unit area is constant. By suitable control of weight or volume, the fibers are fed continuously into a carrying vehicle of air in which they are dispersed and uniformly distributed in the felter.

The felter is one which is capable of depositing the fibers as a continuous felt on a moving foraminous conveyer, or screen, by directing the fibers in air suspension toward the screen in a depositing region in a manner to assure uniformity in the felt. Such uniformity aims for a uniform content of oven-dry fiber within every unit area of the felt, and further aims for identity of felting or formation in every such area. Required mat uniformity is best achieved by uniformity of fiber constitution in fibers per se and their carried moisture and additives, uniformity of mat density, uniformity in thickness and identity in fiber-size distribution over each unit area. Constancy of fiber impact at each local area on deposition assists in attaining these objectives.

Once formed the mat may be set aside for hot-pressing, or be pressed immediately. Conventionally, hot-presses operate in a batchwise cycle consisting of multiple-unit loading, pressing and unloading. Hence, the continuously forming web is cut into unit lengths as it is formed, and each cut length is placed on a caul on which it may remain until it is placed in the press. A cover caul is preferably placed on the top of a mat resting on such a caul, and the resulting caul-mat-caul sandwiches may be stacked for convenience and are ready for hot-pressing.

The press cycle factors of time, temperature and pressure are adjusted to the density of board desired, the moisture content of the fiber in the mat, and the curing variables of the resin. In general these factors are interdependent and subject to variation and standardization for uniform results.

Control of uniformity in the mat structure is best achieved by depositing the mat at a relatively low density in the range from 1 to 6 pounds per cu. ft., the density so given throughout this description and in the claims being always in terms of oven-dry content, whereby variable water content does not alter the definitive terms. The initially formed mat may be continuously compressed before it is cut. Where such compression is effected by one or more rolls operating on the screen-deposited mat, a density of six pounds per cu. ft. is a preferred upper limit, to retain flexibility and integrity of formation. Thereafter, when the mat is cut into lengths and is mounted on a caul, additional compression may be effected as by platen pressure, to form reasonably self-sustaining felted but unbonded mats. Such compressed mats are useful as thermosetting preform sheets.

Platen pressing of the mat with or without heat may effect a density in the range from 6 to 80 pounds per cu. ft. Without heat, the pressed mat may be dry or moist, and is useful as a preform for a thermosetting operation with or without compression to form plane or irregular bodies. The lower the density in said range from 6 to 80 lbs., the more readily the mat may be shaped. The preferred practice is to hot-press directly to rigid board having a density in the range from 30 to 80 pounds per cu. ft.

The various steps and alternatives above described are combined as a sequence of operations which may be conducted with such dispatch that raw wood is converted to hard board in a time as short as 8 to 10 minutes.

In Fig. 1 wood 10 is chipped at 11 forming a supply of chips 12. Chips 12 are defibered in steam at 13, as by the said process of Asplund, forming hot moist fibers 14. Fibers 14 moving in a vehicle of steam are combined at 15 with one or more streams of liquid additive, such as resin solution 16, and a liquid 17 containing a water-resister. The resulting fibers 18 are conveyed at 19 in a conduit, still in the vehicle of steam to assure uniformity of mixing with said additives. Then the steam and fibers are separated at 20 as in a cyclone, releasing to the atmosphere moist treated fibers 21. Where additive is introduced before defibering, as described above, it may enter the process as indicated at 17a.

A stream of hot dehydrating air 22 receives and carries at 23 the said fibers 21 to reduce the moisture content and provide a predetermined composition of moisture-bearing fibers 24. The fibers 24 are then suspended in air as at 25 at a predetermined and constant concentration, to provide a moving suspension thereof as at 26, which is used at 27 to form a felted mat 28 at a density of 1 to 6 lbs. per cu. ft., as described. The mat 28 may be initially formed at a density less than six lbs. per cu. ft. and be compressed as shown at 29 to said density. Then the mat 28 may be subjected to various combinations of heating and pressing.

Numeral 30 shows the mat 28 as hot-pressed sufficiently to thermoset the resin and increase the density to a value in the range from 6 to 80 lbs. per cu. ft., forming semi-rigid to rigid bound products 31.

The mat 28 may be densified by mere compression as shown at 32 to form an unbonded felt 33 at any handleable density from 6 to 80 lbs., per cu. ft. Such a mat may then be heated to thermoset the resin, or be heated and pressed to a greater density in the said range, all as indicated at 34 to form rigid mass 35.

Figures 2, 3:
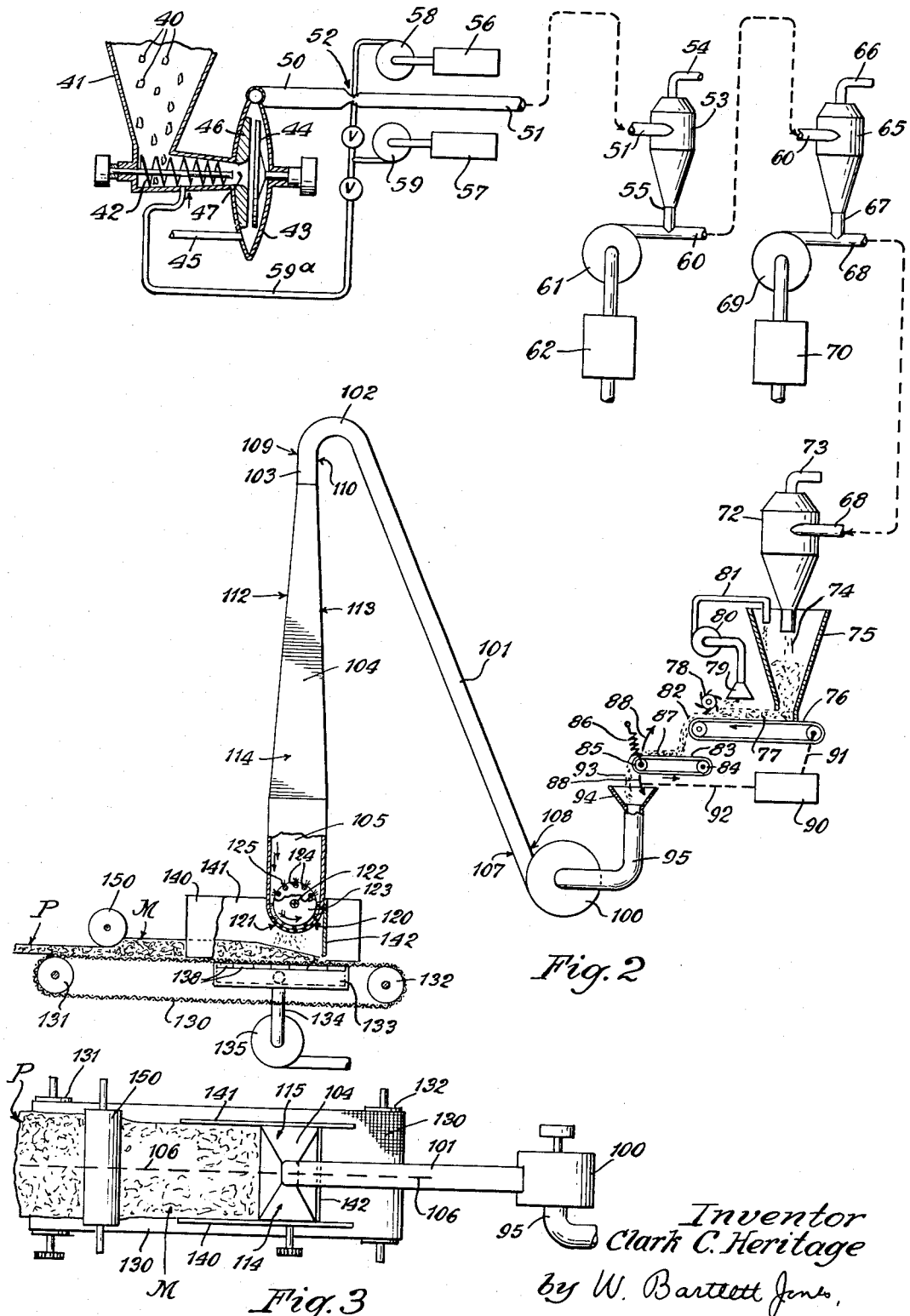
Fig. 2 is a diagrammatic sketch of functioning steps and apparatus in the continuous process.
Fig. 3 is a plan view of the felting machine shown in Fig. 2 with which the plan view is alined.

Fig. 2 shows the sequential relation of various steps above discussed with diagrammatic apparatus included.

Wood chips 40 in hopper 41 are fed by screw 42 into a high-pressure steam chamber 43 encasing a rotary defibering disk 44. Water may be introduced with the chips. Steam is introduced by pipe 45. Disk 44 operates in opposition to stationary disk 46 having a central aperture 47 through which the chips, now softened by steam, enter the space between the disks for defibration and travel to the disk periphery. The resulting fiber is centrifugally discharged in a continuous stream, as in discharge conduit 50, which connects to a conduit 51 of smaller diameter through a much smaller-diameter orifice 52 for pressure reduction. Conduit 51 runs for an appreciable distance, for example 70 feet, into a cyclone separator 53 which discharges steam at 54 and fiber at 55.

Numerals 56 and 57 represent supplies, respectively, of resin solution, and of a liquid containing a water-resisting agent, of which illustrative compositions are hereinafter given. Pumps 58 and 59 are connected to said supplies to introduce a continuous stream of each liquid into the fiber stream at the low pressure side or orifice 52, for mixing in conduit 51. When the water-resister is one such that its function is not impaired when passing through the defibrator, it may be introduced to the wood before its defibration is shown by connection 59a.

The fiber as discharged from conduit 51 into the cyclone generally has a moisture content in the range from 50 to 60% by weight. These fibers are reduced in moisture content by entering a stream of hot air in conduit 60, propelled by blower 61 which draws its air through heater 62. Conduit 60 extends for a considerable distance, for example 150 feet, for moisture exchange between fiber and air. The initial temperature of the air on meeting the fiber may be 200° to 300° F. with a flow of 1200 to 2000 pounds per hour of oven dry fiber and of about 170 cu. ft. of air per second. To expedite the dehydration, a repetition of this step may be practiced as illustrated.

Conduit 60 enters separator cyclone 65, which discharges moist air at 66 and fiber at 67. The discharged fiber enters another stream of hot air, for example at 70° to 290° F. in conduit 68, propelled by blower 69 drawing air through heater 70. The ratio of materials may be the same as above given for conduit 60. Likewise, conduit 68 runs for an effective distance, for example 120 feet, to a separating cyclone 72.

The time in the defibering environment is usually in the range from 30 to 60 seconds, but this may be prolonged by slower feed at screw 42, or suitable elongation of the path to be travelled in that environment. The time from the orifice 52 to the terminal cyclone 72 is of the order of 40 to 60 seconds.

Cyclone 72 discharges air at 73 and drops fiber 74 of controlled moisture content into a supply hopper 75 as a store for the felting operation. A suitable measuring mechanism receives material from the hopper for the felting. Under the hopper 75 is a horizontal endless belt 76 which carries away from the hopper a layer 77 of the fluffy mass 74. Over the belt is a kick-back leveling rotor 78, such as a mandrel with spikes on it. This rotor kicks back the excess of material in the layer 77 over a predetermined level for which the rotor is set. A suction hood 79 connected to the suction side of blower 80 carries away the floating excess and delivers it through conduit 81 back to hopper 75.

The constant volume layer 82 leaving rotor 78 drops to a suitable regulator device for controlling the rate at which fiber leaves belt 76. This regulator may be an endless belt 83 on two rolls 84 and 85, turning at a constant speed. One roll 84 is shown as mounted on a fixed axis, and the axis of roll 85 floats in a balanced condition involving, for example, tension spring 86. The weight of fiber 87 on belt 76 predetermines the vertical position of roll 85, as indicated by the arrows 88. Numeral 90 illustrates a variable speed drive connected by mechanism 91 to operate belt 76. The vertical position of roll 85 operates by connecting mechanism 92 to regulate the variable speed drive 90. By proper setting, the feed of too much fiber to belt 83 lowers it and this acts to reduce the speed of belt 76. By such a control a constant and uniform stream of fiber 93 is dropped into a hopper 94 for felting.

The felting may be accomplished by various mechanisms but it must be effected to produce the conditions described, where uniform products are the objective. The following described apparatus is suitable.

Hopper 94 leads to conduit 95 which feeds into the suction side of a blower 100 operated at constant speed for uniformity. It has a discharge conduit 101 rising high to a goose-neck 102 and then turning downwardly at 103. At 103 the passageway flares gradually as a hood 104 having a horizontal rectangular cross-section enlarging downwardly to a vertical section 105 of uniform rectangular cross-section. As shown, the blower 100, conduit 101, hood 104 and section 105 are alined as indicated by dotted line 106 (Fig. 3) for a very important reason. This is explained by reference to the drawings diagramming the felter.

The blower 100 discharges centrifugally into conduit 101 causing at the area designated 107 a greater concentration of fiber and heavier particles than exists at the opposite area 108. These inequalities tend to equalize along conduit 101 up to gooseneck 102. Here centrifugal action again throws a heavier concentration and heavy particles more to area 109 than to area 110. Consequently, down the front wall 112 of the hood 104 there is a heavier concentration than along the opposite wall 113. There effects do not lead to departures from equality of concentration crosswise of the hood in the direction between side walls 114 and 115 (Fig. 3). Were the gooseneck 102 turned 90° horizontally and counter-clockwise on the vertical axis of its down-feeding leg, the concentration would be heavier along wall 114 than along wall 115. This would lead to non-uniform felting across the felting machine.

The section 105 is provided with a semi-cyclindrical head 120 which is perforated at 121 over an arc of about 100° with holes of size to effect individualization and dispersion of the fibers for felting. Means is provided to agitate a supply of fibers within said head to prevent clotting and to maintain a fluff from which the air rushing through the perforated head carries individual fibers. Agitation minimizes plugging of holes, and also the delivery of slugs from the holes.

As an agitator there is provided a "squirrel cage" type of rotor 122 having end disks 123 connected by bars 124 near the cylindrical face of the rotor. Disks rather than spiderweb ends are preferred to minimize gathering of flocculated fiber. The direction of rotation is preferably such as to mesh material carried by the agitator with the heavier downfeeding stream along the front wall. In Fig. 2 the rotor turns counter-clockwise where the conduit 101 approaches from the rear as described. The speed of rotation may be varied and its most effective speed varies with the amount of fluff present in the head at equilibrium conditions of operation. Bars 124 may carry bristles 125 which are effective to brush fibers through the perforations.

For fiber prepared as described from Douglas fir wood a perforated head is employed having round holes of 5/16 inch diameter countersunk on the exterior opening. Holes are alined on 1/2 inch centers along geometrical elements of the head, and adjacent elemental rows are staggered on 0.4375 inch centers. The countersinking shortens the length of the cylindrical part of the hole and substantially prevents forming and discharging plugs. Countersinking counteracts the effect of thickness in the perforated plate. Square holes and other sizes and positionings of round holes have been used, however, in the head 120.

The head 120 discharges toward a moving endless screen 130 running at a constant speed over rolls 131 and 132. Where the head is 24 inches in diameter, the lowermost portion is preferably 6 to 18 inches above the screen. Beneath the screen and comprehending the area of deposition thereon, there is a suction box 133 connected to the intake 134 of a blower 135, also operating at fixed condition. Preferably, the blower 135 is controlled with respect to its volume of air and is preferably operated to draw in all the air discharged through the head 120, but it may be operated to draw in slightly more or slightly less. The result is that the fibers deposit as a felt in a region which may be exposed at atmospheric pressure. Where more air passes through blower 135 than is supplied by blower 100, atmospheric air is drawn into the suction box, forming an air envelope through which fines and fiber do not pass and stray into the atmosphere. Suction in the range from 1 to 30 inches of water in box 133 is adequate for the felts described.

The actual area of suction and the effective degree of suction locally in the deposition area may be controlled by removable plates or gates 138 placed under the screen 130, having varied degrees of perforation, or even being imperforate as blanks. As a mat builds up on screen 130, it offers increased resistance to air flow. Where equalized suction over the depositing area is desired, the gates 138 are more open at the forward end and less at the rear end to compensate for such resistance. The deposition area is bounded laterally by side plates 140 and 141 extending downwardly close to the screen 130. These serve to form vertical edges on the mat M being formed between them.

Where less air enters the suction system than is supplied by blower 100, which is sometimes desirable, there is a tendency to blow air or to winnow in both directions along the screen 130 away from the head. At the rear, this may be prevented by a cross-plate 142 reaching nearly to the screen. It may be desirable or beneficial to let air from the head 120 blow forward over the mat M already formed, because this carries light weight fine fibers which fall on the mat as its top-most layer. Such layer predetermines the appearance of that face when placed against a smooth caul, in a hot-pressed board made from the mat. By varying the character of this top layer through control of the extent of forward winnowing, the facial appearance or texture of a hard pressed board may be varied at will between limits.

The success of the felter in forming a uniform mat of the character described, depends upon constancy of conditions. These include rate of feed of uniform fiber, rate and constancy of agitation in the head, constancy of air streams through blowers 100 and 135, and rate of travel of screen 130.

The mat M as deposited may vary widely in its density, depending upon the impact of fibers at deposition. Likewise its thickness may vary. It is preferred initially to form a mat with a low density in the range from 1 to 6 pounds per cu. ft. and, if necessary for removal from the screen, to densify it on the forming screen. This may be done by one or more compression rolls, of which only roll 150 is shown. This forms mat designated P.

Figure 4:
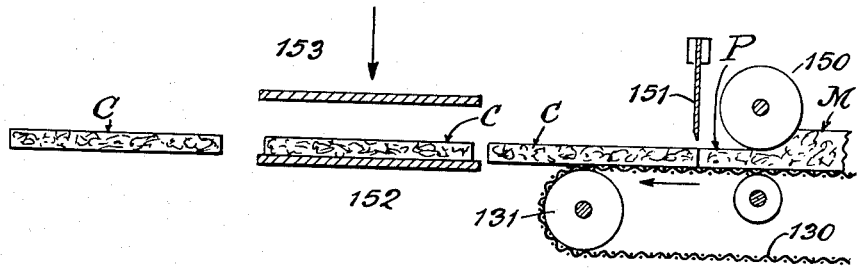
Fig. 4 is an enlarged view in continuation of the processing from Fig. 2, showing in particular the assembly of mat units between caul plates.

Fig. 4 shows units of mat P leaving screen 130, after having been suitably cut by a knife 151 to units C. A caul plate 152 is positioned to receive and carry a unit C. By covering unit C with a second caul 153 such units may be stacked for immediate use or for storage, and may be inverted if desired.

The face-covering cauls may be retained against unit C for a pressing operation, or one or both may be removed. A wide variation of operations in pressing is possible. The moisture content of unit C may be such under some conditions of pressing that the faces of unit C are wetted just before hot-pressing, or such that a venting screen against one face of the unit C is desirable. Also, the temperature of the platens may be so high that it is desired to retard the transfer of heat to the unit C, by using an insulating member such as a fiber felt or wire screen in a suitable place between the mat and a directly-heated platen. Two combinations are illustrated. In the preferred combination insulation is incorporated into the platen structure, as by placing a wire screen with or without an intervening caul plate over the face of the directly heated platen, and then covering the screen with a suitable thick metal caul plate to function as the platen face.

Figure 5:
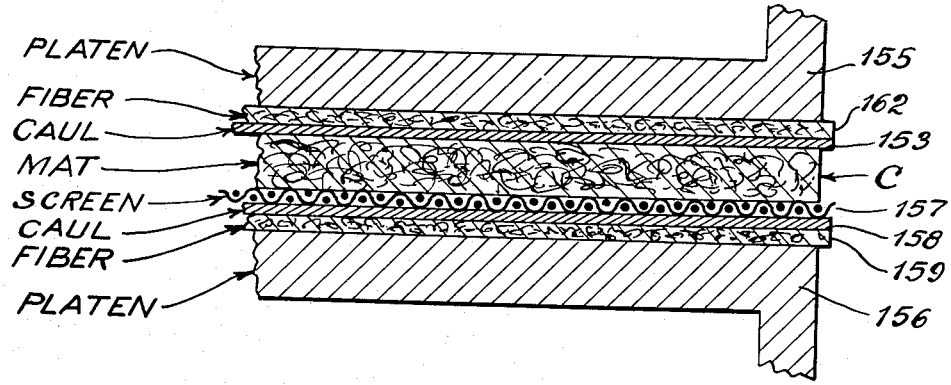
Fig. 5 is a view illustrating an assembly for hot-pressing between conventional heated platens.

Fig. 5 shows how the pressing may be carried out in a conventional press lacking insulated platens. In Fig. 5, the numerals 155 and 156 represent two heated platens of a multiple-opening press, movable vertically toward and away from each other, between which a laminated assembly including unit C is heated and compressed, with control of rate of closing, extent of closure, and rate of heating the mat. Unit C is represented as having caul 153 against the surface to be formed with controlled texture as described. A venting wire screen 157 is shown under the opposite and lower face of unit C. Beneath the screen 157 is a metal caul plate 158, then a sheet of insulation 159 such as a fiber sheet. The upper caul plate 153 is covered by an insulating sheet 162, such as a fiber sheet, for contact with platen 155.

Figure 6:
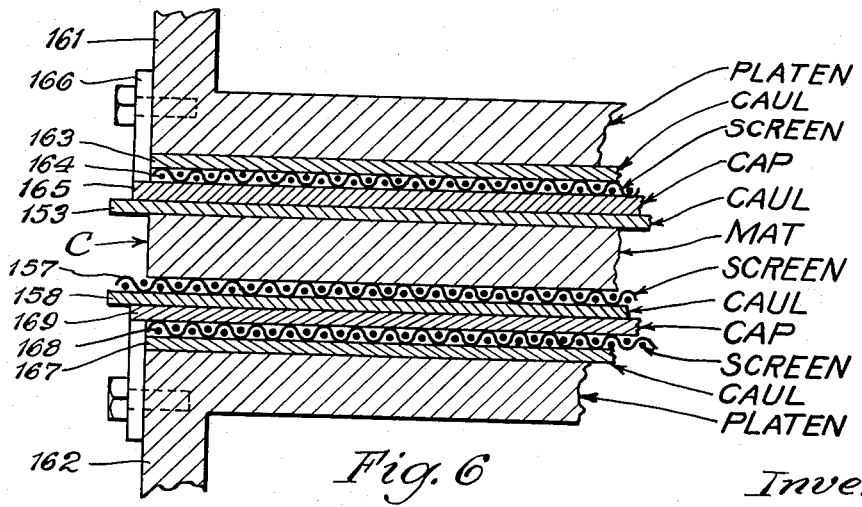
Fig. 6 illustrates a modified pressing assembly in which insulation is included in the platen structures.

Fig. 6 illustrates use of a press with platens especially insulated for the purposes of the present invention to produce dense fiberboard. In a multiple opening press a single heated platen serves as the bottom platen for one assembly and as the top platen for a like assembly next below it. Accordingly each platen in a press has both faces insulated, and each may be considered as a top platen 161 in Fig. 6 and as a bottom platen 162 in Fig. 6.

Over the face of the top platen 161 is placed a suitable caul plate 163, specifically an aluminum plate 0.040 inch thick to protect the face of platen 161 from an insulating member, such as a 10-mesh woven wire screen 164 of stainless steel wire. Over the insulator is placed a suitable cap caul plate 165, as of stainless steel or boiler plate, and specifically stainless steel 0.063 inch thick. The cap caul 165 has integral right-angular ears 166 spaced apart around its periphery which are bolted to the side edges of the platen. The bottom platen 162 is similarly constructed with the elements over the platen face in the following order: caul plate 167, wire screen 168, and cap caul plate 169.

Within the opening of the two insulated platens is placed an assembly such as that shown in Fig. 5 consisting of caul plate 158, screen 157, mat C and caul 153.

Using the resin A hereinafter described, and the assembly of Fig. 6 the platens 161 and 162 may have a temperature in the range from 225 to 500° F. to thermoset the resin and dry the unit C preferably to a moisture content of less than 1%, at a thickness of 0.135 inch and a final density of about 64 lbs. per cu. ft. Density, thickness and moisture content may be varied by changing numerous factors as is well known in the art.

As raw material, any kind of wood may be used. Unless otherwise specified herein, the details pertain to Douglas fir.

The water-resister may be rosin, or a liquid hydrocarbon such as paraffin or petrolatum. It may be an aqueous suspension or emulsion of rosin, or of wax, or of suitable mixtures. An emulsion is readily broken in meeting the fibers in steam, and the suspended emulsoid melts and penetrates the fibers.

*Resin.*—A wide variety of thermosetting resinous material may be used as binder. Dissolved resin in aqueous solution readily penetrates the fibers, but where the resin content is precipitable from such a solution, conditions favoring precipitation of resin over penetration by resin are employed. These conditions may be effected by fiber composition, and resin composition as mutually related.

As described, alkali-stabilized resin solutions, such as those of phenol-formaldehyde condensation products, are suitable for precipitating resin on neutralization of at least a part of the stabilizing alkali. Suitable ones are the alkali-stabilized phenol-formaldehyde resin solutions of U. S. Booty Patents No. 2,462,252 and No. 2,462,253. Although these are resins specially prepared for use as plywood glue lines, they function in the present invention. The action of such resins in the present invention is illustrated as follows:

*Resin A* is a solution available commercially having 38% of solids (mostly resin solids). The resin is a condensation of one mole of phenol and 2 to 2.5 moles of formaldehyde. It has a hot-plate cure time at 150° C. of 9 seconds±3 seconds. A test specimen of 100 gms. of the resin A solution diluted to 18% solids, as used for resin supply 56 has a pH of 10.5. The diluted solution, electro-titrated with HCl solution of about 0.1 normality to lower the pH, became opaque at pH of 9.15. At pH of 8.9 the resin was completely precipitated. The significance of these values appears later herein in connection with Fig. 7.

Other alkali-stabilized phenol-formaldehyde resins are available, one being herein identified as resin B, according to Booty U. S. Patent No. 2,462,252, formulated especially for plywood glue-lines. One value of the present invention is the highly efficient use of small amounts of resin as binder in hard fiberboard.

The following two series of tests of Table I are made on different specimens X and Y of defibrator (Asplund) Douglas fir fiber, which of itself has binder in its water-soluble content, using different resins A and B. As little as 1 part of added resin greatly increases the strength of the board. Each series also includes petrolatum in the amount of 2.5 parts per 100 parts of fiber to impart water-resistance, this being added to the defibrator prior to discharge of the fibers to meet the resin-stream. The boards are formed to a density of 64 pounds per cu. ft.

Resin A has been used for fiber X, and resin B of Booty U. S. No. 2,462,252 has been used for fiber Y. Boards similarly made have been evaluated as given in Table II.

TABLE II

[S=Strength: given as modulus of rupture in p. s. i.±300.]

| Resin Solids Used in Parts per 100 of Oven Dry Fiber | Fiber X Resin A S | Fiber Y Resin B S |
|---|---|---|
| 0 (Blank) | 4,900 | 4,200 |
| 1 | 7,100 | 5,500 |
| 2 | 8,100 | 6,700 |

*Example I*

Sound Douglas fir wood, containing both heart wood and sapwood but less than 2% bark contamination and having a moisture content of 30% to 50% calculated on the total weight of the wet wood is made into roughly rectangular chips which pass a screen of 1-inch mesh by means of a ten-knife rotary chipper. The chips are fed at the rate of 1675 pounds of oven-dry material per hour into the horizontal preheater of a type C Asplund machine. The screw speed is maintained at 28–34 R. P. M. with a preferred rate of 31 R. P. M. 43.3 pounds per hour of molten petrolatum is mixed with the chips in the vertical preheater. The preheater is maintained at a temperature of 350° F. The plug of chips enters the body of the Asplund defibrator which is maintained at 350° F. by 120 p. s. i. g. saturated steam. 70 to 110 gallons per hour of water at room temperature is added to the disk-chamber of the defibrator by means of metering pumps. The defibrator is equipped with standard American Defibrator Company abrading discs. The fiber and steam are discharged through a round hole orifice which is 23/32 inch in diameter. Immediately downstream from the orifice 17.3 pounds per hour of phenol-formaldehyde resin solution A diluted with water to 18.5% resin solids is pumped into the rapidly moving fiber stream. The resin and petrolatum-carrying fibers are discharged into a conveying and mixing conduit at a moisture content of 50% on a total basis, as described above. The steam which conveys the stream of fiber is separated from the fiber in a cyclone and the fibers are picked up by a stream of heated air in which they are conveyed through a conduit for a distance of approximately 150 feet. The air has an initial temperature of about 250° F., and the amount of air is approximately 170 cubic feet per second. The fiber is separated from its air vehicle by means of a cyclone at a moisture content of 25%.

The partially dried fiber is preferentially passed through an air elutriation device, specifically a Raymond Whizzer manufactured by Combustion Engineering Company and is divided into a coarse and a "fines" fraction. Under normal operation the coarse fraction amounts to approximately 15% of the total amount of fiber. The coarse material is routed through a dry plate refiner, specifically an Allis Chalmers Interplane Grinder and is reduced in particle size. This treated fraction is re-blended with the fines from the elutriator in a vehicle of air and the final product has a moisture content of 25% to 30% on a total basis. The fiber particle size is preferably such that no more than 18% is retained on an 8-mesh screen of a Clark Classifier. The fiber as described contains 1.0% of resin solids and 2.5% petrolatum on a total oven dry solids basis. The pH of an aqueous extract of the treated fiber is 5.3±0.3. The resin is firmly anchored to the fibers as a coat. The fiber color is that of the natural wood.

The treated fibers put into an air stream by means of a volumetric feeder as described above are uniformly felted onto a moving wire screen. The screen moves at the rate of 1.6 feet per second. Random distribution of the fibers is achieved. The mat thickness is 4.5 to 5.0 inches corresponding to about 1.7 pounds per cu. ft. density. This felted density is continuously increased to approximately 3.0 pounds per cu. ft. by a cold roll acting on the moving mat. The continuous mat is cut into units or sections C of the desired length by a traveling cut-off saw. The cut units feed continuously from the screen to automatically positioned cauls. A protective caul is placed over the top of the mat and the sandwich is removed from the line.

When ready for pressing a top surface of the mat is sprayed with water when a glazed surface is desired, as in the manner set forth in a copending application of Roberts Serial No. 467,638, filed November 8, 1954. The unsprayed face of the mat is placed on a 14-mesh stainless steel wire screen and covered with a stainless steel caul. The sandwiches are placed into a multiple opening hot platen press, preferably with the cauls insulated from the platens by metal screens or by heat-resistant fabric.

A typical mat C as produced by Example 1 may be 2.6 inches thick at 3 pounds per cu. ft. (oven-dry fiber basis), with a uniform moisture content of 25%. The face adjacent caul plate 153 may be wet with 155 ounces of water per 100 sq. ft. sprayed on evenly just prior to pressing, thereby to form a glazed face against the caul plate.

With platens constructed as shown in Fig. 6 and heated to 400° F. the following cycle of pressing produces a panel ⅛ inch thick at 64 pounds per cu. ft., using a press having a light ram for movement and a heavy ram for pressure:

| | Seconds |
|---|---|
| To eliminate open space in press | 15 |
| To reach 48 p. s. i. with light ram | 5 to 10 |
| To compress at 48 p. s. i | 15 to 25 |
| To reach 750 p. s. i. with heavy ram | 20 |
| To hold at 750 p. s. i | 45 |
| To relax pressure to 48 p. s. i | 30 |
| To hold at 48 p. s. i | 30 |
| To increase to 60 p. s. i | 30 |
| To increase to 80 p. s. i | 30 |
| To increase to 750 p. s. i | 15 |
| To hold at 750 p. s. i | 45 |
| To relieve and open press | 30 |

The pressed board is removed from the press, trimmed, and if desired, placed in a humidifying chamber until a moisture content of approximately 6% has been achieved. The unhumidified board has a moisture content of less than 1%.

The finished product is a hard-pressed board having one smooth side and one screen-marked side. The modulus of rupture of the board is 6000 to 7000 p. s. i. and the 24-hour water absorption is 18% to 22% of water based on the weight of board tested, by soaking 12-inch square samples in water for 24 hours immersed 1 inch below the surface of water at 70° F. The board is light and uniform in color and shows only slight variations in properties between machine and cross-machine directions.

Although the process described and illustrated is the preferred one, in part because of the usefulness of the Asplund defibrator for combination with the remaining steps quickly to convert wood to fiberboard, it is by no means a limitation of the invention. A feature of the steaming, however done, is to increase the acid content of the whole wood substance, thereby to increase its capacity to precipitate resin. Wood substance in its natural state has sufficient acid content to precipitate resin in the same manner and amounts as specifically illustrated for Asplund fiber.

Accordingly, fiber of raw wood may be conveyed in steam or air and mixed with alkaline resin solution to resin-coat the fibers, and such fibers may be dehydrated or not, and felted and hot-pressed to boards.

Figure 7:
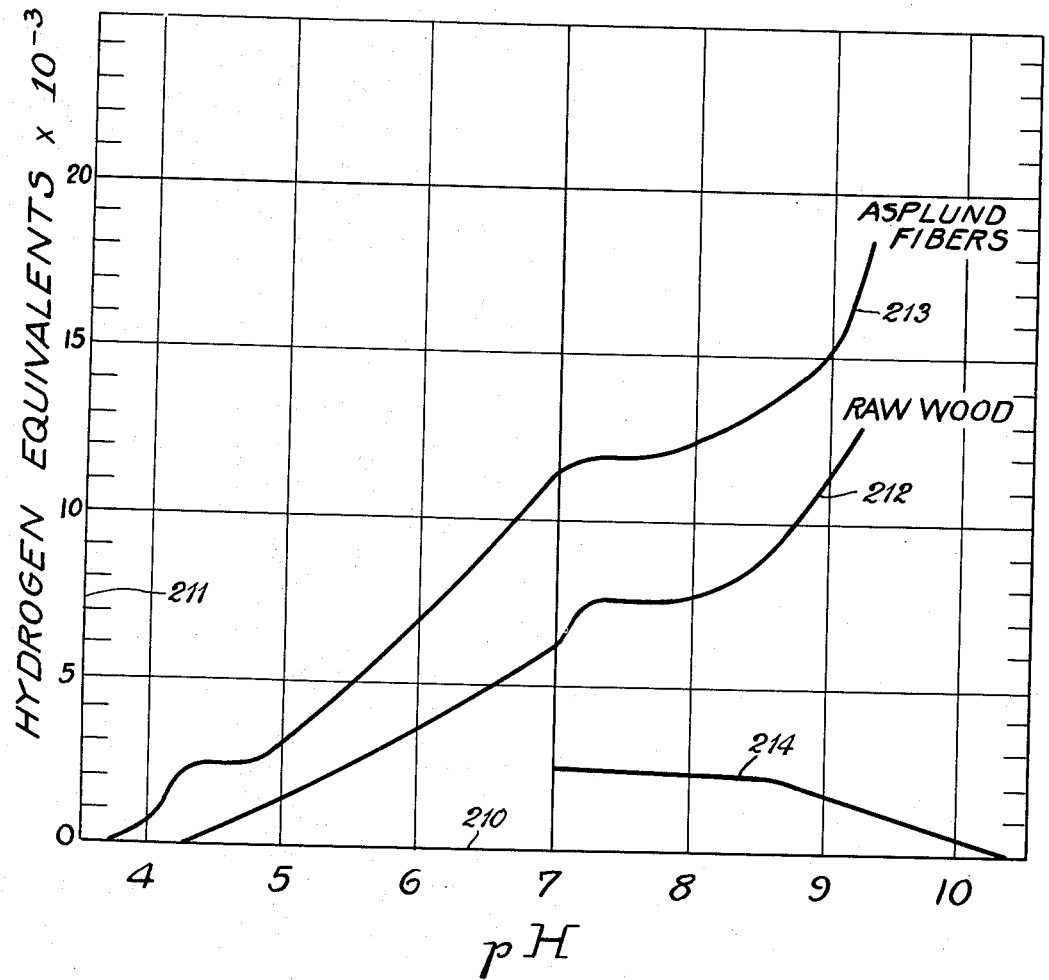
Fig. 7 is a graph illustrating the capacity of wood fibers as raw wood and as steamed wood to react with alkali to secure various end values in pH; and showing the hydrogen equivalents of an alkaline resin solution.

Fig. 7 is a plot of pH values on horizontal axis 210 against hydrogen equivalents on vertical line 211. By titrating whole wood fibers in suspension in water with standardized 0.1 normal NaOH solution, and measuring pH values as changed by each addition, values may be plotted to give curves. These curves reflect the acidity of the fiber, or rather the alkali-binding powers to secure fibers of a raised pH.

Wood is naturally acid. Certain substances in wood are usefully fusible at pH values below 7. When alkali is added to raise the pH values above 7 these substances become salts which are not fusible, thereby rendering such fibers less flowable in hot-molding procedures. By steaming the wood and adding to the acid content, more resin, as described, may be precipitated onto the fibers to yield resin-coated fibers at pH of 7 or lower. To the extent that acid is required, the steaming in time or temperature may be increased to generate more acid.

The generation of acid is illustrated by the two curves in Fig. 7. Curve 212 is the titration curve of ultimate fibers of raw Douglas fir, wherein the indicated acidity is that inherent and natural to that species. The fiber used for the like curve 213 is that produced by normal operation of the Asplund machine using Douglas fir wood. The vertical distances at any pH, between the two curves 212 and 213 represent the generated acidity as a result of such defibering. At pH of 7, the acidity has been almost doubled. These values were secured on 100 grams of wood substance (oven dry basis).

Curve 214 represents a titration curve of Resin A with dilute hydrochloric acid, the plotted values representing one gram of resin solids.

Table III represents the titration observations.

*Table III*

| 1<br>pH | 2<br>Equivalents of HCl × 10⁻³ | 3<br>Condition |
|---|---|---|
| 10.4 | 0 | Clear solution. |
| 9.2 | 1.39 | Turbidity. |
| 8.9 | 1.92 | Precipitation Complete. |
| 7.0 | 2.38 | |

To generalize, it may be said that when any mass containing the resin solution attains a pH of 8.9 or lower, all the resin solids are precipitated. At the precipitation point the mixture is alkaline, and more acid may be added to lower the pH to neutral pH of 7 and even lower.

By the present invention, the wood fibers are used as the acid in a gaseous environment so that all the resin precipitates on the fibers, as distinguished from forming a turbid suspension if water were present, as in the test titration.

At pH of 7, curve 212 shows that 100 grams of fiber provide about 6 units of acid, and curve 213 shows that the Asplund fiber form provides about 11.5 units of acid. Curve 214 shows that resin solution A, to provide one gram of resin solids in a mass at pH of 7 requires about 2.38 units of acid. For resin-coated fibers at pH 7, 100 parts of raw fibers (curve 212) will precipitate approximately 6/2.38 or 2.5 parts of resin solids. But the normal Asplund form of the same wood will precipitate approximately 4.85 parts of resin solids. Also, the curves show that where 1 part of resin solids is used to 100 parts of Asplund fiber (213), the pH of the coated fibers will be approximately 4.5, which is substantially the pH of the raw wood, namely 4.3.

The apparatus may be operated over a wide range of conditions for its numerous variables in order to achieve different predetermined effects. The superatmospheric pressure in the head is preferably much less in degree than the subatmospheric pressure in the suction box, largely because of the resistance to air passage imposed by the mat being formed. Suitable operating ranges are from 0.1 to 1.0 inch of water as positive pressure in the head and from 1 to 30 inches of water negative pressure in the suction box.

In one particular study of such variables, the following spans within greater ranges have been covered:

Conveyor speed _____ 2.5 to 10.5 feet per minute.
Fiber feed _____ 1275 to 2540 pounds per hour.
Fiber deposited _____ .76 to 2.04 pounds per sq. ft.
Fiber moisture _____ 10 to 26.8 percent by weight.

Delivery air:
   Statis pressure in head. 0.25 to .63 inch of water.
   Volume _____ 2460 to 3570 cu. ft. per minute.

Suction air:
   Negative pressure in box. 4.18 to 7.38 inches of water.
   Volume _____ 2550 to 3940 cu. ft. per minute.

Volume ratio of suction:
   Air to delivery air_ 0.88 to 1.22.

All of the above are directed to conditions for producing pressed boards of ⅛ inch thickness at 64 pounds per cu. ft.

Accordingly, by steaming the resin-coated fibers may be raised in capacity to hold resin while remaining neutral or acid at pH 7 or lower, for advantages in molding or hot-pressing. Reference is made to my copending application Serial No. 334,165, filed January 30, 1953, wherein the resin precipitation is more generically described and claimed, and to my copending application Serial No. 542,001, filed October 21, 1955, as a continuation-in-part of Serial No. 313,496, filed October 7, 1952, now abandoned, which application Serial No. 542,001 is generic to the present invention.

I claim:

1. The method which comprises mechanically defibering wood in a gaseous environment substantially all to ultimate fibers and opened-up aggregates of ultimate fibers, said fibers including acid content which is substance of the original wood, conveying a continuous stream of the resulting fibers in a gaseous vehicle in an elongated conduit, the said gaseous environment and vehicle being substantially inert to said acid content, mixing with said stream in said conduit a continuous stream of alkaline stabilized solution of thermosetting resin capable of precipitating resin on neutralizing at least a part of the alkalinity, whereby said two streams mix, and proportioning the quantities of said solution and of fibers so that acid in the fibers effects a precipitation of all the resin on the fibers providing resin-coated fibers.

2. The method which comprises both mechanically defibering wood in a gaseous environment substantially all to ultimate fibers and opened-up aggregates of ultimate fibers and subjecting the substance of said wood to the action of steam, the temperature of the steam being that corresponding to a pressure in the range from atmospheric pressure to 200 pounds per square inch gauge for a time sufficiently short to preserve within the fibers substantially all the content of the wood, whereby the action of the steam increases the water-soluble and acid contents of the wood substance, conveying a continuous stream of the resulting fibers in a gaseous vehicle in an elongated conduit, the said gaseous environment and vehicle being substantially inert to said acid content, mixing with said stream in said conduit a continuous stream of alkaline stabilized solution of thermosetting resin capable of precipitating resin on neutralizing at least a part of the alkalinity, whereby said two streams mix, and proportioning the quantities of said solution and of fibers so that acid in the fibers effects a precipitation of all the resin on the fibers providing resin-coated fibers.

3. The method which comprises both mechanically defibering wood in a gaseous environment substantially all to ultimate fibers and opened-up aggregates of ultimate fibers and subjecting the substance of said wood to the action of steam, the temperature of the steam being that corresponding to a pressure in the range from atmospheric pressure to 200 pounds per square inch gauge for a time sufficiently short to preserve within the fibers substantially all the content of the wood, whereby the action of the steam increases the water-soluble and acid contents of the wood substance, conveying a continuous stream of the resulting fibers in a vehicle of steam in an elongated conduit, mixing with said stream in said conduit a continuous stream of alkaline stabilized solution of thermosetting resin capable of precipitating resin on neutralizing at least a part of the alkalinity, whereby said two streams mix, and proportioning the quantities of said solution and of fibers so that acid in the fibers effects a precipitation of all the resin on the fibers providing resin-coated fibers.

4. The method which comprises both mechanically defibering wood in an atmosphere of steam substantially all to ultimate fibers and opened-up aggregates of ultimate fibers and subjecting the substance of the wood to the action of steam, the steam being at a pressure in the range from 50 to 200 pounds per square inch gauge and the time of exposure to steam being sufficiently short to preserve within the fibers substantially all the content of the wood, whereby the action of the steam increases the water-soluble and acid contents of the wood substance, ejecting a continuous stream of said acid-bearing fibers in a vehicle of steam from a high pressure environment into an elongated conduit at a lower pressure environment, mixing with said stream in said conduit a continuous stream of alkaline stabilized solution of thermosetting resin capable of precipitating resin on neutralizing at least a part of the alkalinity, whereby said two streams mix, proportioning the quantities of said solution and of fibers so that the said acid in the fibers effects a precipitation of all the resin on the fibers, and removing the resulting resin-coated fibers from the vehicle of steam.

5. The method which comprises both mechanically defibering wood in an atmosphere of steam substantially all to ultimate fibers and opened-up aggregates of ultimate fibers and subjecting the substance of the wood to the action of steam, the steam being at a pressure in the range from 50 to 200 pounds per square inch gauge and the time of exposure to steam being sufficiently short to preserve within the fibers substantially all the content of the wood, whereby the action of the steam increases the water-soluble and acid contents of the wood substance, ejecting a continuous stream of said acid-bearing fibers in a vehicle of steam from a high pressure environment into an elongated conduit at a lower pressure environment, mixing with said stream in said conduit a continuous stream of alkaline stabilized solution of thermosetting resin capable of precipitating resin on neutralizing at least a part of the alkalinity, whereby said two streams mix, proportioning the quantities of said solution and of fibers so that the said acid in the fibers effects a precipitation of all the resin on the fibers, conveying the resulting resin-coated fibers in a moving stream of heated dehydrating gas for a time and distance to remove moisture from the fibers to a moisture content not over 60% by weight, the said conditions of moisture removal being selected with respect to the thermosetting properties of the resin to minimize loss of the latter, and separating the resulting fibers from the dehydrating vehicular air as a supply of unbonded thermosetting substantially whole-wood fibers.

6. The method which comprises mechanically rubbing and defibering wood in an environment of steam at a pressure in the range from 50 to 200 pounds per square inch gauge and at a temperature at which lignin content of the wood is softened to facilitate defibration to substantially ultimate wood fibers and opened-up aggregates of ultimate fibers for a time in the range from 30 seconds to 6 minutes and the time of exposure to steam being sufficiently short to preserve within the fibers substantially all the content of the wood and not over about 120 seconds at 200 pounds per square inch gauge, whereby the resulting moist mass of fibers contains increased contents of water-soluble material and of acid, distributing onto the said fibers suspended in a moving stream in a vehicle of steam an aqueous solution of thermosetting resin-forming material which solution has a pH above that of the fibers and is characterized by precipitability of resin-forming solids at a lowered pH value, the quantity of said solution being limited for a precipitation of all the resin solids therein by acid in the fibers, whereby the acid in the fibers effects precipitation of said solids on the fibers, moving the coated fibers in a vehicle of dehydrating gas at non-thermosetting temperature and time for said solids and thereby quickly reducing the moisture content of said coated fibers to a content not over 60% by weight, whereby said fibers are non-coherent in mass form except for mechanical interfelting, and separating the fibers from the resulting moisture-laden air as a mass of feltable thermosetting fibers.

7. The method of claim 6 wherein the dissolved resinous material is a phenol-formaldehyde condensation product.

8. The method of claim 6 wherein a stream of a non-suspending proportion of a fluid containing material capable of rendering the fibers water-resistant when dry is also distributed onto said fibers in said moving stream for providing water-resistant resin-coated fibers.

9. The method of claim 7 wherein a stream of a non-suspending proportion of a fluid containing material capable of rendering the fibers water-resistant when dry is also distributed onto said fibers in said moving stream for providing water-resistant resin-coated fibers.

10. The method which comprises both mechanically defibering wood in a gaseous environment substantially all to ultimate fibers and opened-up aggregates of ultimate fibers and subjecting the substance of said wood to the action of steam, the temperature of the steam being that corresponding to a pressure in the range from atmospheric pressure to 200 pounds per square inch gauge and the time of exposure to steam being sufficiently short to preserve within the fibers substantially all the content of the wood and not over about 120 seconds at 200 pounds per square inch gauge, whereby the resulting moist mass of fibers contains increased contents of water-soluble material and of acid, distributing onto the said fibers suspended in a moving stream in a vehicle of steam an aqueous solution of thermosetting resin-forming material which solution has a pH above that of the fibers and is characterized by precipitability of resin-forming solids at a lowered pH value, the quantity of said solution being limited for a precipitation of all the resin solids therein by acid in the fibers, whereby the acid in the fibers effects precipitation of said solids on the fibers, moving the coated fibers in a vehicle of dehydrating gas at non-thermosetting temperature and time for said solids and thereby quickly reducing the moisture content of said coated fibers to a content not over 60% by weight, whereby said fibers are non-coherent in mass form except for mechanical interfelting, and separating the fibers from the resulting moisture-laden air as a mass of feltable thermosetting fibers.

11. The method of claim 10 wherein the dissolved resinous material is a phenol-formaldehyde condensation product.

12. The method of claim 10 wherein a stream of a non-suspending proportion of a fluid containing material capable of rendering the fibers water-resistant when dry is also distributed onto said fibers in said moving stream for providing water-resistant resin-coated fibers.

13. The method of claim 11 wherein a stream of a non-suspending proportion of a fluid containing material capable of rendering the fibers water-resistant when dry is also distributed onto said fibers in said moving stream for providing water-resistant resin-coated fibers.

References Cited in the file of this patent

UNITED STATES PATENTS

| Number | Name | Date |
|---|---|---|
| 2,190,672 | Meharg | Feb. 20, 1940 |
| 2,402,160 | Heritage | June 18, 1946 |
| 2,405,213 | Heritage | Aug. 6, 1946 |
| 2,454,534 | Walter | Nov. 23, 1948 |
| 2,553,412 | Heritage | May 15, 1951 |
| 2,573,321 | Ernst | Oct. 30, 1951 |
| 2,610,138 | Heritage | Sept. 9, 1952 |
| 2,635,301 | Schubert et al. | Apr. 21, 1953 |
| 2,646,381 | Duval | July 21, 1953 |